United States Patent [19]

Teramoto et al.

[11] Patent Number: 5,048,410
[45] Date of Patent: Sep. 17, 1991

[54] APPARATUS FOR SECURELY CLAMPING A TRANSMISSION SHAFT OF A TRANSFER FEED PRESS DURING ITS SHUTDOWN

[75] Inventors: Naoki Teramoto; Kiyoshi Uneme, both of Yokohama, Japan

[73] Assignees: Ishikawajima-Harima Jukogyo Kabushiki Kaisha, Japan; Ishikawajima-Harima Jukogyo Kabushiki Kaisha, Japan

[21] Appl. No.: 489,912

[22] Filed: Mar. 7, 1990

[30] Foreign Application Priority Data

Apr. 5, 1989 [JP] Japan .................. 1-86444

[51] Int. Cl.$^5$ ........................... B30B 15/14
[52] U.S. Cl. ........................... 100/48; 72/26; 72/405; 72/421; 100/53; 100/99; 100/207; 100/215; 192/148
[58] Field of Search ............ 100/215, 216, 48, 53, 100/207, 45, 99; 192/144, 148, 129 R, 129 A; 72/417, 419, 421, 422, 425, 405, 25, 26

[56] References Cited

U.S. PATENT DOCUMENTS

| 3,044,350 | 7/1962 | Hartnett | 192/148 X |
| 3,300,011 | 1/1967 | Willmann | 192/144 X |
| 3,438,473 | 4/1969 | Rohrbacher | 192/148 |
| 3,774,740 | 11/1973 | Kubota | 192/148 X |
| 4,028,926 | 6/1977 | Olesovsky | 72/422 |
| 4,269,293 | 5/1981 | Martin | 192/144 X |
| 4,436,199 | 3/1984 | Baba et al. | 72/405 X |
| 4,785,657 | 11/1988 | Votava | 72/405 |

FOREIGN PATENT DOCUMENTS

| 3237191 | 4/1983 | Fed. Rep. of Germany | 100/215 |
| 129626 | 2/1978 | German Democratic Rep. | 72/26 |
| 602297 | 2/1960 | Italy | 192/148 |
| 58-23523 | 2/1983 | Japan . | |
| 63-2525 | 1/1988 | Japan . | |
| 63-25220 | 2/1988 | Japan . | |
| 63-194831 | 8/1988 | Japan | 72/405 |
| 1055556 | 11/1983 | U.S.S.R. | 72/26 |

Primary Examiner—Harvey C. Hornsby
Assistant Examiner—Stephen F. Gerrity

[57] ABSTRACT

A disk is fitted over a transmission shaft which delivers drive force from a press drive to feed bars. Engagement members are selectively engaged with and disengaged from teeth on the disk so that when engagement members are engaged with the disk, the movement of the feed bars is interrupted. As a result, maintenance operation can be carried out safely.

1 Claim, 5 Drawing Sheets

APPARATUS FOR SECURELY CLAMPING A TRANSMISSION SHAFT OF A TRANSFER FEED PRESS DURING ITS SHUTDOWN

BACKGROUND OF THE INVENTION

The present invention relates to an apparatus for securely clamping a transmission shaft of a transfer feed press during its shutdown.

As shown in FIG. 1, a conventional transfer feed press generally designated by 57 has slides 37 vertically movable through gearing and connecting rods 36 by a press drive which in turn is generally indicated by 1 and is disposed at an upper portion of the press 57. Part of the drive force from the drive 1 is transmitted through a transmission shaft 2 to a drive shaft 3 to swing bars 6 through a cam 4 and a link 5 carried by the shaft 3 so that a feed bar 7 is advanced in the direction indicated by arrow c and then returned in the direction indicated by arrow f, whereby a work 8 is transferred.

The shaft 3 has a cam 9 fitted over one end of the shaft 3 for reciprocation of an input shaft 11 on a bed through a mechanical interlocking mechanism 10 so that rotating force is transmitted to a plurality of shafts 14 through pairs of racks 12 and pinions 13 carried in a spaced-apart relationship by the shaft 11. The rotating force received by each of the shafts 14 is then transmitted through bevel gears 15 and 16 to a splined shaft 17 which is in engagement with a pinion 18. Then, the pinion 18 causes the feed bar 7 to move vertically through a lift rack 19 and a lift stand 20 so that the work 8 clamped by fingers 21 extending from the feed bars 7 is moved upwardly in the direction indicated by arrow b or downwardly in the direction indicated by arrow d.

A cam 22 is fitted over the other end of the drive shaft 3 to reciprocate an input shaft 24 on the bed through a mechanical interlocking mechanism 23 so that the rotating force is transmitted to a plurality of shafts 27 through pairs of racks 25 and pinions 26 carried by the shaft 24 in a spaced-apart relationship. The shaft 27 receives the rotating force and imparts thrust through a pinion 28 and a rack 29 to a rack shaft 30 which carries a rack 31, and transmits the thrust through the rack 31, a synchronizing pinion 32 and a rack 34 on a shaft 33. This results in moving the opposed feed bars 7 toward or away from each other laterally through feed bar supports 35 connected to the shafts 30 and 33 thereby carrying out the work clamping or releasing operation in the direction indicated by arrow a or e. In this case, the lift rack 19 is laterally displaced along with the pinion 18 since the latter is displaced along the shaft 17 in the axial direction thereof. Thus the feed bars 7 receive the power from the press drive 1 and accomplish the clamping operation in the direction indicated by arrow a, the upward movement in the direction indicated by arrow b, the feed operation in the direction indicated by arrow c, the downward movement in the direction indicated by arrow d, the releasing operation in the direction indicated by arrow e and the return movement in the direction indicated by arrow f.

Referring further to FIG. 1, the drive 1 includes a main motor 38, a main clutch 39 and a drive shaft 40 which rotates when the clutch 39 is engaged. As shown in FIG. 2, a main brake 41 with a ring gear 42 is securely attached to an end of the drive shaft 40. Upon replacement of a die, a micro-inching operation is carried out such that the main clutch 39 and a micro-inching brake 43 are released and then a micro-inching clutch 44 is engaged and a micro-inching motor 45 drives the drive shaft 40. Therefore, fine adjustment in height of the slide 37 can be accomplished through connecting rods 36.

In FIG. 1, reference numeral 46 denotes a motor with a clutch 47 and a brake 48 for adjusting the movement of the feed bars 7; 49, a brake for preventing the transmission shaft 2 from rotating when the drive 1 is de-energized, thereby securing the safety; 50 and 51, hydraulic cylinders adapted to detach the interlocking mechanisms 10 and 23 from the cams 9 and 22 upon maintenance or the like; 52, hydraulic cylinders for forcibly moving the feed bars 7 away from each other in case of emergency; 53, an air cylinder adapted to cause the interlocking mechanism 10 to press against the cam 9 upon the operation; 54, an air cylinder for biasing the opposed feed bars 7 toward the center of the line; 55, an overload coupling with a clutch; and 56, dies.

In addition to the above, there are various types of conventional transfer feed presses as disclosed in the Japanese Patent 1st Publication No. 23523/1983 and the Japanese Utility Model 1st Publication Nos. 2525/1988 and 25220/1988. Like the transfer feed press of the type described above, in any of the transfer feed presses disclosed in the above-described Publications, a drive causes feed bars to clamp a work, to move upwardly, to feed the work, to move downwardly, to release the work and to return. Works are sequentially fed while the slides are moved upwardly or downwardly, thereby pressing the work.

With the transfer feed press 57 described above with reference to FIG. 1, provided that any of the brakes 41, 43, 48 and 49 is broken, there is concern that upon the shutdown of the transfer feed press the slides 37 will move downwardly by their own weight and that their downward forces will be transmitted through the overload coupling 55 and the transmission shaft 2 to the feed bars 7, resulting in sudden movement of the feed bars 7.

Even if none of the brakes are broken, release of the pressures in the hydraulic cylinders 50, 51 and 52 or release of the pressing forces of the air cylinders 53 and 54 for maintenance may cause, depending upon the positions of the mechanisms 10 and 23, the gravity and other unexpected forced to be imparted to the drive shaft 3 and the input shafts 11 and 24. Thus, there is a fear that the drive shaft 3 will be forced to rotate and the input shafts 11 and 24 will be forced to move fowardly or backwardly, resulting in the movement of the feed bars 7 as described above.

Also in the transfer feed presses disclosed in the above-described Japanese Publications, release of the pressures in the hydraulic cylinders or release of the pressing force of the air cylinders may cause, under some conditions, feed bars to move due to the gravity and other forces imparted to the cam.

This is undesirable situation from a standpoint of safety since such sudden movement of the feed bars may lead to the injury of an operator or operators present in the installation for the purpose of maintenance or repair or replacement of a die during the shutdown.

In view of the above, it is a primary object of the present invention to prevent the sudden movement of the feed bars during the shutdown of the transfer feed press.

BRIEF DESCRIPTION OF THE DRAWINGS

The same reference numerals are used to designate similar parts throughout the figures.

DETAILED DESCRIPTION OF THE PREFERRED EMBODIMENT

Figure 4:
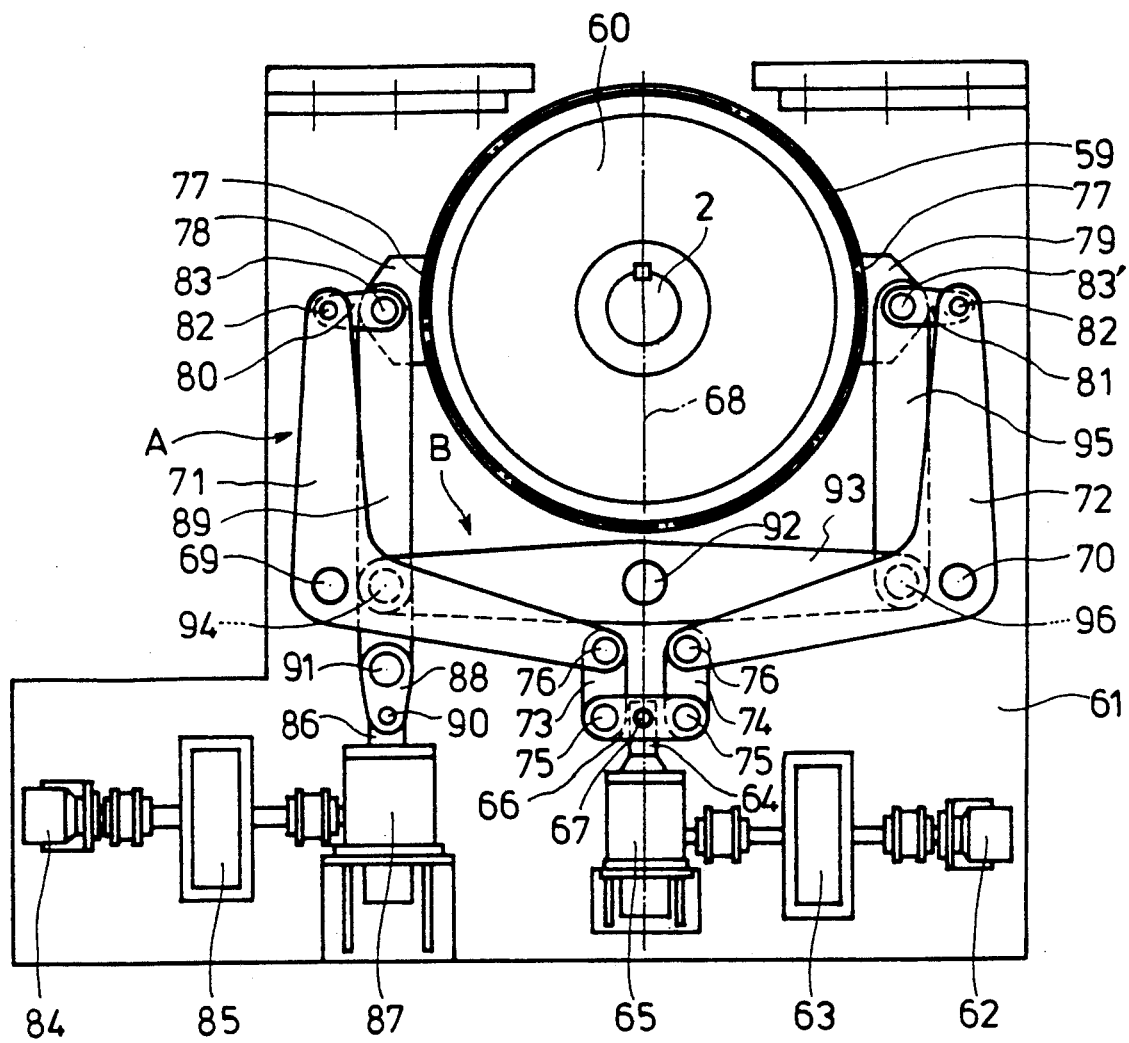
FIG. 4 is a top view illustrating a transmission shaft securing apparatus of the preferred embodiment shown in FIG. 3.
Figure 5:
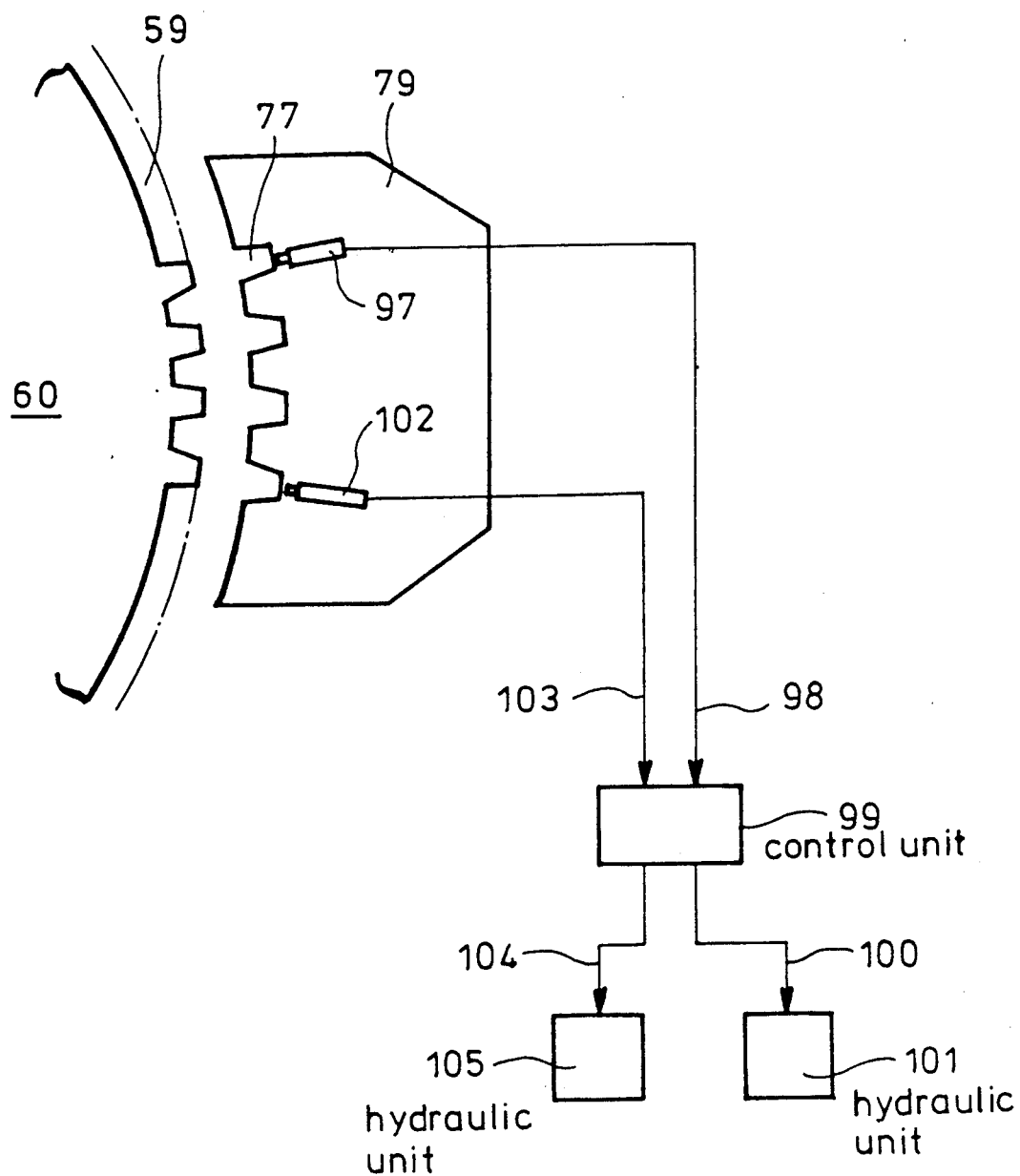
FIG. 5 is a diagram of a control circuit used for the apparatus shown in FIG. 4.

Now a preferred embodiment of the present invention will be described in detail with reference to the accompanying drawings and especially FIGS. 3-5.

The transmission shaft 2 is securely attached at its lower end through a universal joint 58 to a disk 60 having teeth 59 at its outer periphery.

A bracket 61 is securely attached to a frame which in turn is securely attached to a foundation. The transmission shaft 2 extends through the bracket 61 on which a drive 65 such as screw jack is securely mounted. The drive 65 has a rod 64 which can be extended toward or retracted from the shaft 2 through an oil motor 62 and a reduction gear 63. The rod 64 has its leading end to which a first shorter link 66 is pivoted at its center with a pin 67. Symmetrically with respect to a center line 68 connecting the axis of the shaft 2 with the pin 67, angle-shaped rockers 71 and 72 are pivoted at their centers by pins 69 and 70 on the bracket 61 and opposed ends of the rockers 71 and 72 are pivoted to opposite ends of the link 66 through second shorter links 73 and 74 with pins 75 and 76. Engagement members 78 and 79 having teeth 77 adapted to engage with the teeth 59 on the disk 60 are respectively pivoted to the other ends of the rockers 71 and 72 by third short links 80 and 81 and pins 82, 83 and 83' so that the members 78 and 79 are diametrically, opposed on the disk 61 and can be moved toward or away from each other. Thus an opening and closing mechanism as is generally indicated by A is constructed.

A rotating mechanism as shown by B is constructed in the following manner. A drive 87, such as a screw jack having a rod 86 which in turn is extended or retracted in the direction substantially in parallel with the center line 68, is mounted on the bracket 61 on the side of the rocker 71 with respect to the center line 68. The rod 86 is connected at its leading end to the engagement member 78 of the link 71 by a fourth shorter link 88 and a longer link 89 with pins 90, 91 and 83. A connecting link 93 is pivoted at its center with a pin 92 positioned on the bracket 61 and on the center line 68 between the shaft 2 and the pin 67 and is further pivoted with a pivot pin 94 at a position between the ends of the longer link 89. The other end of the link 93 and the engagement member 79 are connected by a shorter link 95 with pivot pins 96 and 83'. Thus the pins 83, 94, 96 and 83' define a parallelogram. Thus the rotating mechanism B is adapted to be displaced in the peripheral direction of the disk 60 while the members 78 and 79 are maintained in the diametrically opposed relationship on the disk 60.

One or each of the engagement members 78 and 79 is provided with a noncontact type position sensor 97, such as photo switch facing the teeth 59 of the disk 60, to detect a position or phase of the teeth 59. An output signal 98 from the sensor 97 is inputted into a control unit 99. The control unit 99 in response to the received output signal 98 delivers a command signal 100 to a hydraulic unit 101 of the oil motor 84 to control the drive 87 of the rotating mechanism B depending upon the detection signal 98 from the sensor 97.

One or each of the engagement members 78 and 79 is provided with a noncontact type proximity sensor 102 facing the teeth 59 of the disk 60 to detect a distance to the teeth 59. An output signal 103 from the sensor 102 is inputted into the control unit 99. The control unit 99 in response to the received output signal 103 delivers a command signal 104 to a hydraulic unit 105 of the oil motor 62 to control the drive 65 of the opening and closing mechanism A depending upon the detection signal 103 from the sensor 102.

Figure 3:
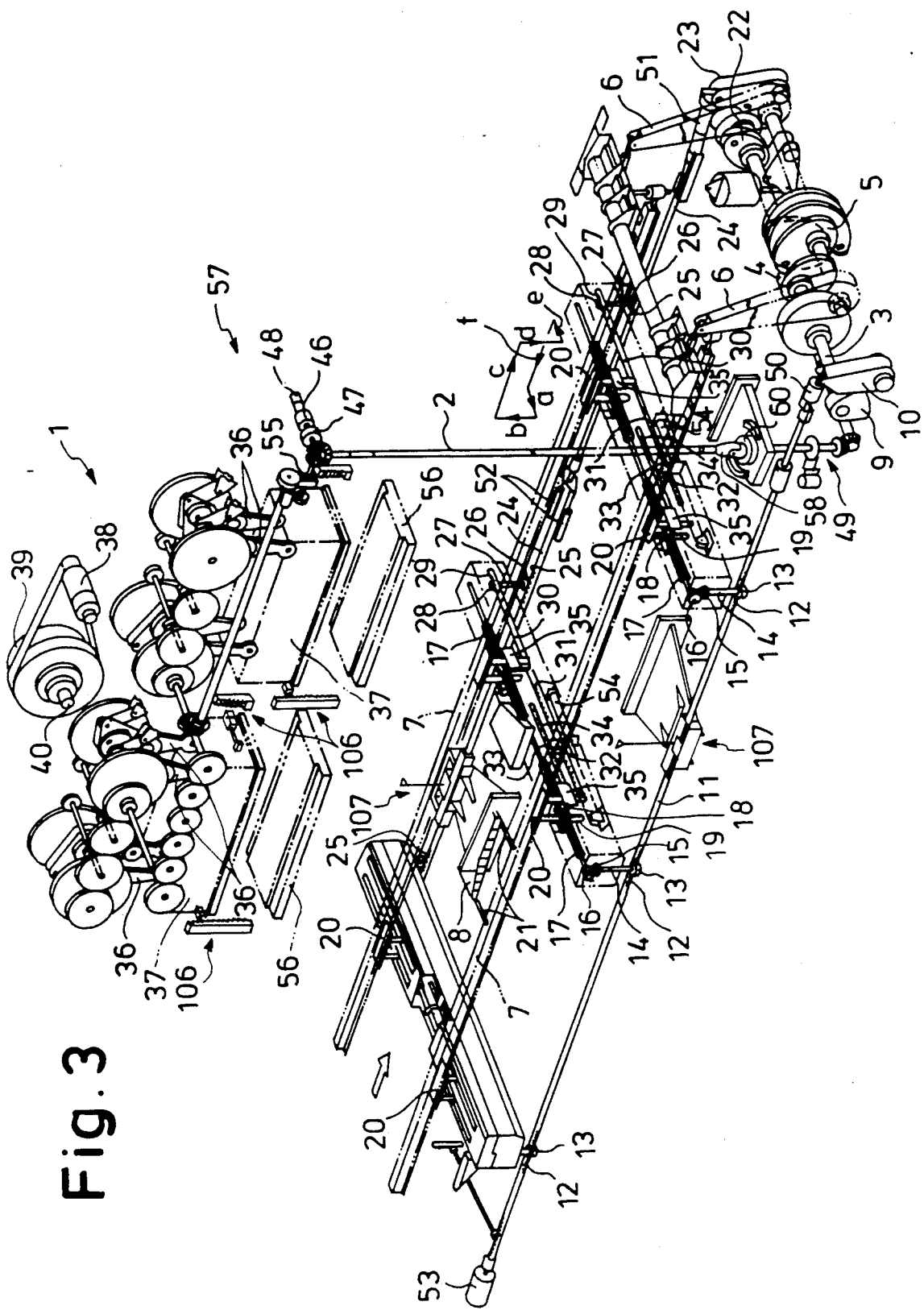
FIG. 3 is a perspective view of a transfer feed press with a preferred embodiment of the present invention.

In FIG. 3, reference numeral 106 denotes a slide clamping device; 107, an input shaft clamping device.

The mode of operation of the apparatus for securing the transmission shaft of a transfer feed press with the above-described construction is as follows.

Figure 1:
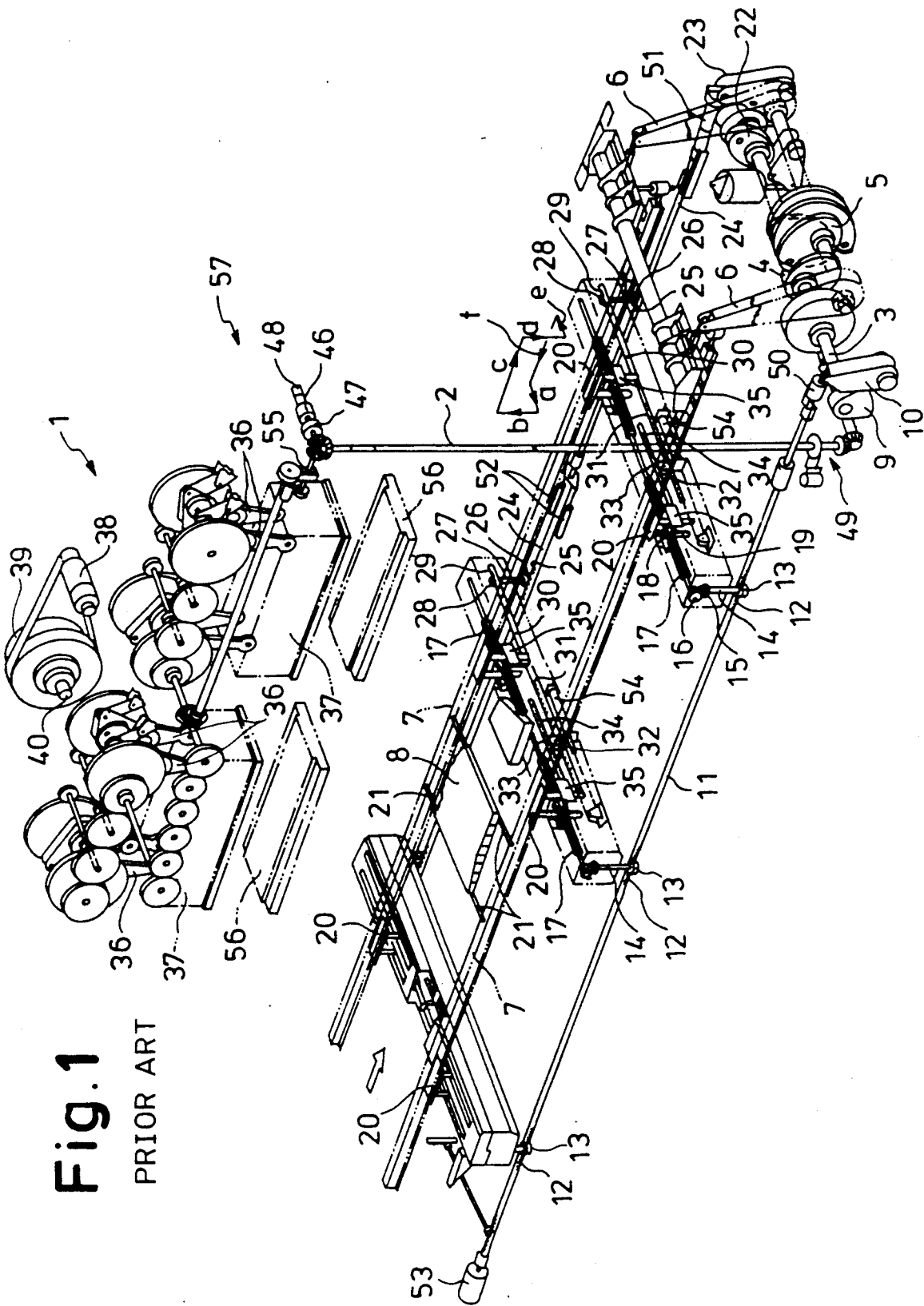
FIG. 1 is a perspective view of a conventional transfer feed press.
Figure 2:
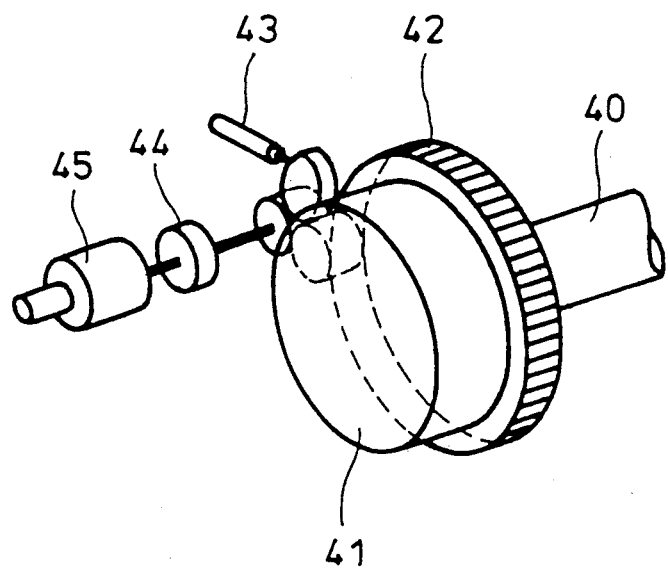
FIG. 2 is a perspective view of a press drive used in FIG. 1 and its associated parts for causing microinching of the drive.

During the operation of the transfer feed press 57, the engagement members 78 and 79 move away from each other and release their teeth 77 from the teeth 59 on the disk 60. Next predetermined clutches are engaged and predetermined brakes are released and the motor 38 is energized to drive the press drive 1. Thus each work 8 is pressed and transferred in a manner substantially similar to that described with reference to FIG. 1.

Upon shutdown of the transfer feed press 57, the main motor 38 is de-energized to de-energize the drive 1. Predetermined clutches are disengaged and predetermined brakes are applied. The transmission shaft securing apparatus then operates in the following manner.

First the rod 86 of the drive 87 is extended or retracted through the oil motor 84 and the reduction gear 85 displacing the engagement member 78 through the links 88 and 89 of the mechanism B in the peripheral direction of the disk 60. In synchronism with this, the link 93 pivoted to the link 89 is caused to swing about the pin 92 displacing the link 95 in the direction opposite the displacement of the link 89. As a result, the other engagement member 79 is displaced in the peripheral direction of the disk 60 while maintaining the opposed diametrical relationship with the engagement member 78 on the disk 60.

In this case, the position sensor 97, incorporated in the engagement member 79, detects the position or the phase of the teeth 59 and delivers the signal 98 to the control unit 99. When the teeth 77 of the engagement members 78 and 79 are in complementary phase with the teeth 59 on the disk 60, the control unit 99 delivers the command signal 100 to the hydraulic unit 101, thereby interrupting the supply of oil to the oil motor 84. As a result, the extension or retraction of the rod 86 of the drive 87 stops, thus stopping the displacement of the engagement members 78 and 79 in the peripheral direction of the disk 60. Thus complementary alignment is established between the teeth 59 on the disk 60 and teeth 77 on the engagement members 78 and 79.

Thereafter, the rod 64 of the drive 15 is extended or retracted through the oil motor 62 and the reduction gear 63 so that the engagement members 78 and 79 are forced to move toward each other through the links 66, 73, 74, 71, 72, 80 and 81.

In this case, the proximity sensor 102 incorporated in the engagement member 79 detects the distance to the teeth 59 on the disk 60 and delivers the signal 103 to the control unit 99, which in turn delivers the command signal 104 to the hydraulic unit 105 when the teeth 59 on the disk 60 are engaged with the teeth 77 on the engagement members 78 and 79, thereby interrupting the supply of the working oil to the oil motor 62. As a result, the extension or retraction of the rod 64 of the drive 65 is suppressed and the displacement of the engagement members 78 and 79 toward the disk 60 is interrupted, whereby the engagement members 78 and 79 are in positive engagement with the disk 60. As a result, the rotation of the transmission shaft 2 is interrupted and the downward movement, the movement toward or away from each other and the forward or backward movement of the feed bars can be prevented. Therefore, one or more operators who enter the transfer feed press 57 for maintenance and other purposes are prevented from being injured, ensuring the safety operation.

When the operation of the transfer feed press is started again, the engagement members 78 and 79 are released from the disk 60.

The pair of members 78 and 79 operates always in the opposed relationship with each other diametrically of the disk 60 so that it becomes possible to engage the disk 60 with the engagement members 78 and 79 at most effective positions on the disk and the rotation of the transmission shaft 2 can be positively prevented with less force.

There are two sensors provided; that is, the position sensor 97 and the limit sensor 102. For position alignment between the disk 60 and the engagement members 78 and 79, the position sensor 97 is used and the positive engagement between the disk 60 and the members 78 and 79 is established by the proximity sensor 102. Therefore, the position alignment between the teeth 59 on the disk 60 and the teeth 77 on the engagement members 78 and 79 can be carried out without the need for any complex mechanism and without the need for any complex arithmetic operation thereby simplifying the construction and the control of the transfer feed press.

By providing each of the members 78 and 79 with the proximity and position sensors 102 and 97, the control can be effected with a higher degree of reliability since even if one of the members 78 and 79 may engage with foreign matter, the detection can be carried out by the sensors 97 or 102 of the other member 78 or 79.

It should be understood that the apparatus for securely clumping the transmission shaft of the transfer feed press during its shutdown in accordance with the present invention is not limited to the above-described embodiment and that various variations or modifications may be effected within the true scope of the invention. For instance, the position and proximity sensors may be disposed on the disk.

As described above, the apparatus for securely clamping the transmission shaft of the transfer press during its shutdown in accordance with the present invention can attain the following advantages:

(1) In shutdown of the transfer feed press, the transmission shaft is securely clamped and the feed bars are prevented from moving vertically, toward or away from each other or forwardly and backwardly, thereby enhancing the safety.

(2) The pair of engagement members are adapted to be displaced in the peripheral direction of the disk while always maintaining the opposed relationship therebetween diametrically of the disk so that the engagement members can engage with the disk at a most effective positions of the disk and the rotation of the transmission shaft can be securely stopped with less force.

(3) One or both of the engagement members are incorporated therein position and proximity sensors so that the positioning of the disk and the engagement members can be accomplished in response to the output signal from the position sensor while the state of engagement between the disk and the engagement members can be confirmed by the proximity sensor so that both of the control and the construction can be simplified.

What is claimed is:

1. An apparatus for securely clamping a transmission shaft of a transfer feed press during its shutdown wherein a drive force from a press drive for vertically moving slides is transmitted through the transmission shaft to feed bars, comprising an externally teeth disk fitted over the transmission shaft and engagement members each having teeth which selectively engage with and disengage from the teeth on said disk;

a rotating mechanism which movably supports a pair of said engagement members and displaces them in the peripheral direction of said disk while said members are maintained in an opposed relationship diametrically of said disk, an opening and closing mechanism for supporting said members for their selective movement toward and away from each other, drive means for driving said rotating mechanism and said opening and closing mechanism, position sensor means for at least one of said members for detecting complementary alignment of the teeth on the corresponding member with the teeth of said disk engaged with each other and sending a signal in response to said alignment, proximity sensor means for at least one of said members for detecting engagement of the teeth on the corresponding member with the teeth of said disk and sending a signal in response to said engagement and a control unit adapted to receive said signal from said position sensor means and said signal for said proximity sensor means and to transmit command signals to said drive means in response to said signals from said position and proximity sensor means to control the drive means of said rotating mechanism thereby stopping said drive means when complimentary alignment or engagement of the teeth are detected or by preliminarily receiving a stoppage signal in anticipation of a time period necessary for the complimentary engagement.

* * * * *

UNITED STATES PATENT AND TRADEMARK OFFICE
CERTIFICATE OF CORRECTION

PATENT NO.  : 5,048,410

DATED       : Sept. 17, 1991

INVENTOR(S) : Naoki Teramoto; Kiyoshi Uneme

It is certified that error appears in the above-identified patent and that said Letters Patent is hereby corrected as shown below:

Title Page, item [73] should read as follows:
[73] Assignees:   Ishikawajima-Harima Jukogyo Kabushiki Kaisha, Japan Signed and Sealed this Fifth Day of January, 1993

Attest:

DOUGLAS B. COMER

Attesting Officer

Acting Commissioner of Patents and Trademarks